US012700116B2

(12) United States Patent
Yang et al.

(10) Patent No.: US 12,700,116 B2
(45) Date of Patent: Aug. 4, 2026

(54) DISTANCE MEASUREMENT METHOD AND DEVICE, AND ROBOT AND STORAGE MEDIUM

(71) Applicant: Beijing Roborock Technology Co., Ltd., Beijing (CN)

(72) Inventors: Guangzhen Yang, Beijing (CN); Yang Yu, Beijing (CN)

(73) Assignee: Beijing Roborock Technology Co., Ltd., Changping District (CN)

( * ) Notice: Subject to any disclaimer, the term of this patent is extended or adjusted under 35 U.S.C. 154(b) by 327 days.

(21) Appl. No.: 18/288,611

(22) PCT Filed: Mar. 9, 2022

(86) PCT No.: PCT/CN2022/080014
§ 371 (c)(1),
(2) Date: Oct. 27, 2023

(87) PCT Pub. No.: WO2022/227876
PCT Pub. Date: Nov. 3, 2022

(65) Prior Publication Data
US 2024/0212182 A1 Jun. 27, 2024

(30) Foreign Application Priority Data

Apr. 29, 2021 (CN) .......................... 202110477259.5

(51) Int. Cl.
*G06T 7/521* (2017.01)
*A47L 9/00* (2006.01)
(Continued)

(52) U.S. Cl.
CPC ........... *G06T 7/521* (2017.01); *G05D 1/2465* (2024.01); *G05D 1/622* (2024.01); *G06T 7/13* (2017.01);
(Continued)

(58) Field of Classification Search
CPC .. G06T 7/521; G06T 7/55; G06T 7/73; G06T 7/13; G06T 2207/10028;
(Continued)

(56) References Cited

U.S. PATENT DOCUMENTS

| | | | |
|---|---|---|---|
| 4,305,657 A | 12/1981 | Masunaga et al. | |
| 9,329,598 B2 * | 5/2016 | Pack ...................... | G01C 21/20 |

(Continued)

FOREIGN PATENT DOCUMENTS

| | | |
|---|---|---|
| CN | 101101204 A | 1/2008 |
| CN | 101441076 A | 5/2009 |

(Continued)

OTHER PUBLICATIONS

International Search Report dated Apr. 28, 2022, issued in related International Patent Application No. PCT/CN2022/080014.

(Continued)

*Primary Examiner* — Gregory M Desire
(74) *Attorney, Agent, or Firm* — Morgan, Lewis & Bockius LLP

(57) ABSTRACT

Embodiments of the present disclosure provide a distance measurement method and device, a robot and a storage medium. The method comprises: acquiring a first image, where the first image at least comprises a to-be-detected object and a ground on which the to-be-detected object is located; determining an initial constraint condition of the ground based on the first image; acquiring a second image, where the second image at least comprises an intersection line of a line structured light beam with the ground and/or with the to-be-detected object; determining a position parameter of the ground based on the second image, and correcting the initial constraint condition of the ground based on the position parameter; and determining a distance (Continued)

to the to-be-detected object based on the corrected initial constraint condition of the ground and the first image.

18 Claims, 5 Drawing Sheets

(51) Int. Cl.

| | | |
|---|---|---|
| *A47L 9/28* | (2006.01) |
| *A47L 11/40* | (2006.01) |
| *G05D 1/246* | (2024.01) |
| *G05D 1/622* | (2024.01) |
| *G05D 105/10* | (2024.01) |
| *G05D 111/10* | (2024.01) |
| *G05D 111/63* | (2024.01) |
| *G06T 7/13* | (2017.01) |
| *G06T 7/55* | (2017.01) |
| *G06T 7/73* | (2017.01) |

(52) U.S. Cl.
CPC .................. *G06T 7/55* (2017.01); *G06T 7/73* (2017.01); *A47L 9/009* (2013.01); *A47L 9/2805* (2013.01); *A47L 9/2852* (2013.01); *A47L 11/4011* (2013.01); *A47L 2201/04* (2013.01); *G05D 2105/10* (2024.01); *G05D 2111/14* (2024.01); *G05D 2111/64* (2024.01); *G06T 2207/10028* (2013.01); *G06T 2207/10048* (2013.01)

(58) Field of Classification Search
CPC .......... G06T 2207/10048; G05D 1/622; G05D 1/2465; G05D 2111/64; G05D 2105/10; G05D 2111/14; A47L 9/009; A47L 9/2805; A47L 9/2852; A47L 11/4011; A47L 2201/04
See application file for complete search history.

(56) References Cited

U.S. PATENT DOCUMENTS

| | | | |
|---|---|---|---|
| 9,594,381 B1 | 3/2017 | Clark et al. | |
| 11,276,191 B2 * | 3/2022 | Lukierski | G05D 1/2465 |
| 11,382,473 B2 * | 7/2022 | Burns | A47L 9/2826 |
| 11,467,599 B2 * | 10/2022 | Ferrer | G06T 7/246 |
| 11,561,102 B1 * | 1/2023 | Ebrahimi Afrouzi | G05D 1/0272 |
| 11,583,154 B2 * | 2/2023 | Chae | G05B 19/4155 |
| 11,656,628 B2 * | 5/2023 | Herlant | G05D 1/0246 701/24 |
| 11,808,580 B1 * | 11/2023 | Ebrahimi Afrouzi | G01C 21/1656 |
| 2002/0196423 A1 | 12/2002 | Shima | |
| 2005/0000543 A1 | 1/2005 | Taylor et al. | |
| 2017/0314930 A1 | 11/2017 | Monterroza et al. | |

FOREIGN PATENT DOCUMENTS

| | | |
|---|---|---|
| CN | 101825441 A | 9/2010 |
| CN | 102865849 A | 1/2013 |
| CN | 103054522 A | 4/2013 |
| CN | 104236521 A | 12/2014 |
| CN | 105286729 A | 2/2016 |
| CN | 105606150 A | 5/2016 |
| CN | 106415423 A | 2/2017 |
| CN | 106524922 A | 3/2017 |
| CN | 106595639 A | 4/2017 |
| CN | 109636903 A | 4/2019 |
| CN | 109673159 A | 4/2019 |
| CN | 109730590 A | 5/2019 |
| CN | 109798870 A | 5/2019 |
| CN | 110864671 A | 3/2020 |
| CN | 111067439 A | 4/2020 |
| CN | 111123278 A | 5/2020 |
| CN | 111223135 A | 6/2020 |
| CN | 111990930 A | 11/2020 |
| CN | 112639400 A | 4/2021 |

OTHER PUBLICATIONS

Office Action dated Sep. 26, 2022, issued in related Chinese Patent Application No. 202110477259.5.
Notice of Allowance dated Feb. 27, 2023, issued in related Chinese Patent Application No. 202110477259.5.
Liu et al., "Real-Time Trust Region Ground Plane Segmentation for Monocular Mobile Robots", IEEE, 2017, 7 pages.
Extended European Search Report issued in corresponding European Patent Application No. 22794355.2, dated Apr. 1, 2025.

\* cited by examiner a             b             c

DISTANCE MEASUREMENT METHOD AND DEVICE, AND ROBOT AND STORAGE MEDIUM

CROSS-REFERENCE TO RELATED APPLICATION

This application is a 35 U.S.C. 371 national phase application of PCT International Application No. PCT/CN2022/080014 filed on Mar. 9, 2022, which claims priority to Chinese Patent Application No. 202110477259.5, filed on Apr. 29, 2021, both of which are incorporated herein by reference in their entireties as a part of the present application.

TECHNICAL FIELD

The present disclosure relates to the technical field of distance measurement of self-moving robots, and in particular, to a distance measurement method and device, a robot, and a storage medium.

BACKGROUND ART

Robot obstacle avoidance often requires distance measurement to sense a spatial relationship between an obstacle and a robot. The spatial relationship may be used as an input for planning the subsequent obstacle avoidance path of the robot. The robot may accurately identify obstacles in a traveling path through continuous path planning. Measuring distance from an obstacle may be accomplished using a variety of methods such as depth cameras, LIDAR, line structured light, monocular cameras, binocular cameras, etc. Monocular distance measurement and dual-line structured light have the characteristic of low complexity of an imaging module, compared with depth perception algorithms such as depth cameras and LIDAR and have the characteristics of a small amount of distance measurement algorithms compared with binocular distance measurement.

SUMMARY OF THE INVENTION

Embodiments of the present disclosure provide a distance measurement method and device, a robot, and a storage medium.

According to a first aspect, an embodiment of the present disclosure provides a distance measurement method, which is applied to a self-moving robot equipped with an image acquisition device, including steps of:

acquiring a first image, where the first image at least includes a to-be-detected object and a ground on which the to-be-detected object is located;

determining an initial constraint condition of the ground based on the first image;

acquiring a second image, where the second image at least includes an intersection line of a line structured light beam with the ground and/or with the to-be-detected object;

determining a position parameter of the ground based on the second image, and correcting the initial constraint condition of the ground based on the position parameter; and determining a distance to the to-be-detected object based on the corrected initial constraint condition of the ground and the first image.

In some embodiments, before the step of acquiring the second image, the method includes a step of; emitting at least one surface-scanning light beam that is not parallel to the ground by a line structured light source, the surface-scanning light beam forming at least one intersection line with the ground.

In some embodiments, the step of emitting at least one surface-scanning light beam that is not parallel to the ground by a line structured light source, the surface-scanning light beam forming at least one intersection line with the ground, includes steps of:

alternately emitting at least two surface-scanning light beams that are perpendicular to the ground by the line structured light source, the surface-scanning light beams forming at least two intersection lines with the ground; or emitting one transverse surface-scanning light beam that is not parallel to the ground and one surface-scanning light beam that is perpendicular to the ground by the line structured light source, the surface-scanning light beams forming at least two intersection lines with the ground.

In some embodiments, the step of emitting one transverse surface-scanning light beam that is not parallel to the ground and one surface-scanning light beam that is perpendicular to the ground by the line structured light source, the surface-scanning light beams forming at least two intersection lines with the ground, includes steps of:

emitting one transverse surface-scanning light beam that is not parallel to the ground toward a traveling direction of the self-moving robot by the line structured light source; and emitting one surface-scanning light beam that is perpendicular to the ground toward a side direction in traveling of the self-moving robot; and the surface-scanning light beams forming the at least two intersection lines with the ground.

In some embodiments, the step of emitting one surface-scanning light beam that is perpendicular to the ground toward a side direction in traveling of the self-moving robot includes step of: emitting one surface-scanning light beam that is perpendicular to the ground toward a downward direction relative to the traveling direction of the self-moving robot.

In some embodiments, an image acquisition device for acquiring the first image is an infrared image acquisition device or a visible light image acquisition device; and an image acquisition device for acquiring the second image is an infrared image acquisition device.

In some embodiments, the first image acquisition device and the second image acquisition device are the same infrared image acquisition device.

In some embodiments, the method further includes steps of: controlling an infrared light source to respectively emit an infrared light beam in different periods of time; and controlling a shooting time sequence to respectively obtain the first image and the second image in the different periods of time by the same infrared image acquisition device.

In some embodiments, the step of determining a distance to the to-be-detected object based on the corrected initial constraint condition of the ground and the first image includes steps of:

determining an object region of the to-be-detected object in the first image, where the object region is the smallest rectangle including the to-be-detected object;

determining a lower edge position parameter of the object region and a lower edge position parameter of the first image based on the corrected initial constraint condition of the ground; and

3 determining the distance to the to-be-detected object based on the lower edge position parameter of the object region and the lower edge position parameter of the first image.

In some embodiments, the step of determining the distance to the to-be-detected object based on the lower edge position parameter of the object region and the lower edge position parameter of the first image, includes steps of:

determining a reference position as an origin of coordinates in the first image;

selecting any point in a lower edge of the smallest rectangle as a first reference point, and determining a second reference point in a lower edge of the first image based on the first reference point; and calculating the distance to the to-be-detected object based on position coordinates of the first reference point and the second reference point.

In some embodiments, the step of determining a position parameter of the ground based on the second image, includes steps of:

acquiring point cloud data for structured light based on the intersection line of the line structured light beam with the to-be-detected object;

filtering the point cloud data for structured light through the initial constraint condition of the ground;

fitting the filtered point cloud data for structured light to obtain a ground equation; and determining the position parameter of the ground by using the ground equation.

In some embodiments, the step of determining a position parameter of the ground based on the second image, includes steps of:

fitting the intersection line of the line structured light beam with the ground;

determining a ground equation based on at least two fitted intersection lines with the ground, and determining the position parameter of the ground by using the ground equation.

According to a second aspect, an embodiment of the present disclosure provides a distance measurement device, which is applied to a self-moving robot equipped with an image acquisition device, including:

a first acquisition unit, configured to acquire a first image, where the first image at least includes a to-be-detected object and a ground on which the to-be-detected object is located;

a first determination unit, configured to determine an initial constraint condition of the ground based on the first image;

a second acquisition unit, configured to acquire a second image, where the second image at least includes two intersection lines of a line structured light beam with the ground and/or with the to-be-detected object;

a second determination unit, configured to determine a position parameter of the ground based on the second image, and correct the initial constraint condition of the ground based on the position parameter; and a third determination unit, configured to determine a distance to the to-be-detected object based on the corrected initial constraint condition of the ground and the first image.

According to a third aspect, an embodiment of the present disclosure provides a robot, including a processor and a memory. The memory stores computer program instructions executable by the processor. The processor, when executing the computer program instructions, implements the steps of any one of the foregoing methods.

According to a fourth aspect, an embodiment of the present disclosure provides a non-transitory computer-readable storage medium, having computer program instructions stored thereon, where the computer program instructions, when called and executed by a processor, implement the steps of any one of the foregoing methods.

Compared with the relevant art, the present disclosure at least has the following technical effects.

Embodiments of the present disclosure provide a distance measurement method and device, a robot, and a storage medium. In the distance measurement method, a monocular distance measurement method and a dual-line structured light distance measurement method are combined. On one hand, correcting the position parameter of the ground by the line structured light beam can effectively solve the impact of bumpy ground on monocular distance measurement. On the other hand, combining the advantages of monocular distance measurement can effectively improve the disadvantage that the dual-line structured light distance measurement has a small range and is limited to a dual-line plane. In addition, the method for locating ground with a line structured light beam can effectively improve the accuracy of monocular distance measurement and better satisfies an overall distance measurement requirement of the robot.

BRIEF DESCRIPTION OF THE DRAWINGS

In order to more clearly illustrate the technical solutions in the embodiments of the present disclosure or the relevant art, the following will briefly introduce the accompanying drawings required to describe the embodiments or the relevant art. Apparently, the accompanying drawings in the following description show some embodiments of the present disclosure, and those skilled in the art may obtain other drawings from these accompanying drawings without creative efforts.

DETAILED DESCRIPTION

To make the objects, technical solutions and advantages of the present disclosure clearer, the present disclosure will be further described in detail below with reference to the accompanying drawings. It is obvious that the described embodiments are only a part of the embodiments of the present disclosure, but not all the embodiments. All other embodiments obtained by those skilled in the art without creative efforts based on the embodiments in the present disclosure are within the protection scope of the present disclosure.

The terms used in the embodiments of the present disclosure are for the purpose of describing particular embodiments only, and are not intended to limit the present disclosure. The singular forms "a/an", "said", and "the" used in the embodiments of the present disclosure and the appended claims are intended to include the plural forms as well, unless otherwise indicated clearly in the context. The term "a plurality of" generally means at least two.

It should be understood that the term "and/or" used herein merely describes an association relationship between associated objects, and indicates that there may be three kinds of relationships. For example, A and/or B may indicate three cases: A exists alone, A and B exist at the same time, and B exists alone. In addition, the character "/" herein generally indicates an "or" relationship between the contextual objects.

It should also be noted that the terms "including", "containing", or any other variants thereof are intended to cover the non-exclusive inclusion, such that a commodity or device including a series of elements includes not only those elements, but also other elements not listed explicitly or elements inherent to such a commodity or device. Without more limitations, the element defined by the phrase "including a . . . " does not exclude the existence of other same elements in the commodity or device including the element.

Optional embodiments of the present disclosure are described in detail below with reference to the accompanying drawings.

Figure 1:
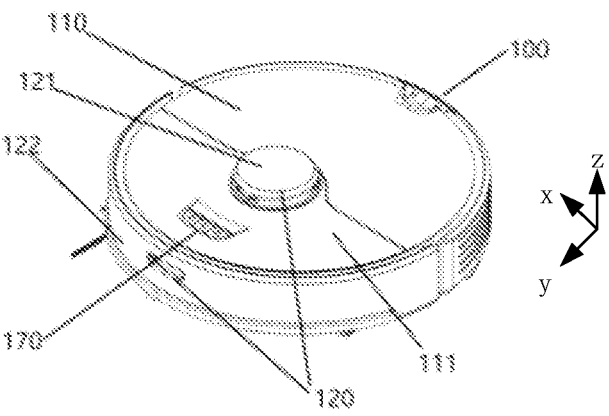
FIG. 1 is a three-dimensional structural diagram of a self-moving robot provided by an embodiment of the present disclosure.
Figure 2:
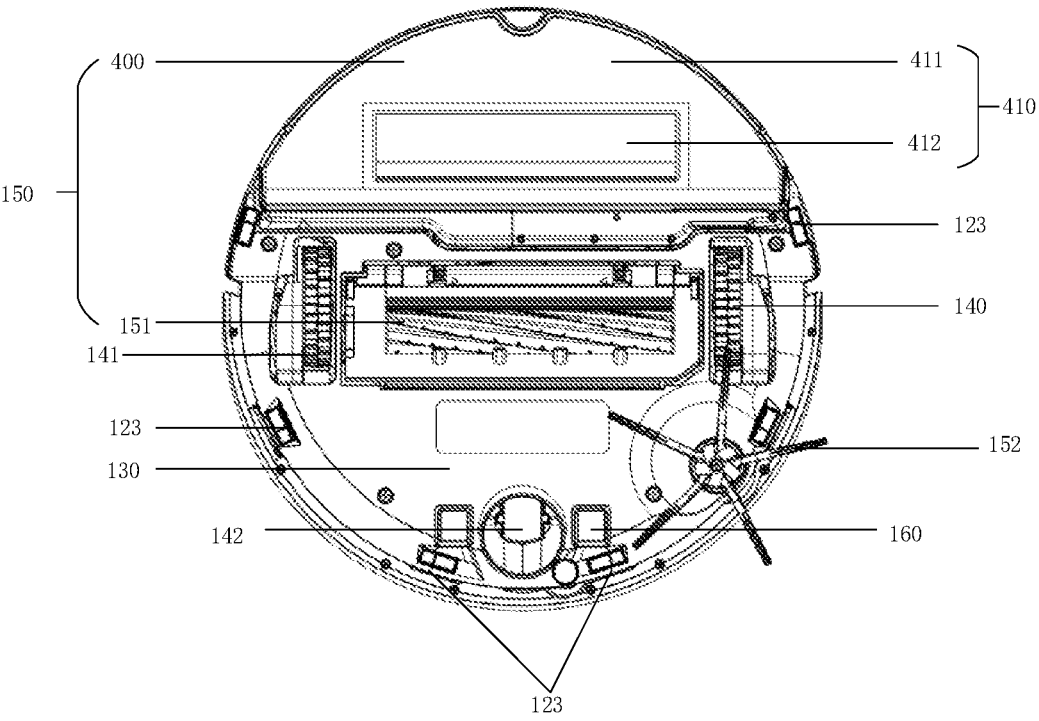
FIG. 2 is a structural top view of a self-moving robot provided by an embodiment of the present disclosure.

FIG. 1 and FIG. 2 are schematic structural diagrams of an automatic cleaning apparatus according to an exemplary embodiment. As shown in FIG. 1 and FIG. 2, the automatic cleaning apparatus may be a vacuum dust-sucking robot, or may be a ground-mopping/ground-brushing robot, or may be a window-climbing robot, or the like. The automatic cleaning apparatus may include a mobile platform 100, a perception system 120, a control system 130, a driving system 140, a cleaning module 150, an energy system 160, and a human-computer interaction system 170.

The mobile platform 100 may be configured to move automatically along a target direction on an operation surface. The operation surface may be a surface to be cleaned by the automatic cleaning apparatus. In some embodiments, the automatic cleaning apparatus may be a self-moving robot such as a ground-mopping robot, a ground-sweeping robot, and a sweeping and mopping robot. In this case, the automatic cleaning apparatus operates on a ground, and the ground may be any operation surface such as a desktop, a roof, a platform, or the like. The automatic cleaning apparatus may also be a window cleaning robot. In this case, the automatic cleaning apparatus operates on an outer surface of glass of a building, and the glass is the operation surface. The automatic cleaning apparatus may be a pipe self-moving robot. In this case, the automatic cleaning apparatus operates on an inner surface of a pipe, and the inner surface of the pipe is the operation surface. For the purpose of presentation only, the following description in the present application takes a ground-mopping robot as an example for illustration.

In some embodiments, the mobile platform 100 may be an autonomous mobile platform, or a non-autonomous mobile platform. The autonomous mobile platform refers to that the mobile platform 100 itself can automatically and adaptively make an operational decision based on an unexpected environmental input. The non-autonomous mobile platform itself cannot adaptively make an operational decision based on an unexpected environmental input, but can execute a given procedure or operate according to certain logic. Correspondingly, when the mobile platform 100 is the autonomous mobile platform, the target direction may be determined autonomously by the automatic cleaning apparatus; and when the mobile platform 100 is the non-autonomous mobile platform, the target direction may be set systematically or manually. When the mobile platform 100 is the autonomous mobile platform, the mobile platform 100 includes a forward portion 111 and a rearward portion 110.

The perception system 120 includes a position determination device 121 located on the mobile platform 100, a buffer 122 located on the forward portion 111 of the mobile platform 100, cliff sensors 123, and sensing devices such as an ultrasonic sensor (not shown), an infrared sensor (not shown), a magnetometer (not shown), an accelerometer (not shown), a gyroscope (not shown), an odometer (not shown), and the like, located at a bottom of the mobile platform, for providing various position information and motion state information of the automatic cleaning apparatus to the control system 130.

In order to describe behaviors of the automatic cleaning apparatus more clearly, directions are defined as follows. The automatic cleaning apparatus may travel on the ground by various combinations of movements relative to the following three mutually perpendicular axes defined by the mobile platform 100, i.e., a transversal axis X, a front and rear axis Y, and a center vertical axis Z. A forward driving direction along the front and rear axis Y is designated as "forward", and a rearward driving direction along the front and rear axis Y is designated as "rearward". The transversal axis X is substantially in a direction passing through an axis center defined by a center point of a driving wheel assembly 141 and extending between a right wheel and a left wheel of the automatic cleaning apparatus. The automatic cleaning apparatus may rotate around the X axis. It is referred to as "pitching up" when the forward portion of the automatic cleaning apparatus is tilted upward and the rearward portion thereof is tilted downward. It is referred to as "pitching down" when the forward portion of the automatic cleaning apparatus is tilted downward and the rearward portion thereof is tilted upward. In addition, the automatic cleaning apparatus may rotate around the Z axis. In a forward direction of the automatic cleaning apparatus, it is referred to as "turning right" when the automatic cleaning apparatus is tilted to the right of the Y axis, and it is referred to as "turning left" when the automatic cleaning apparatus is tilted to the left of the Y axis.

As shown in FIG. 2, cliff sensors 123 are provided in front and rear of the driving wheel assembly 141 respectively at the bottom of the mobile platform 100, for preventing the automatic cleaning apparatus from falling off when the automatic cleaning apparatus retreats, so as to avoid any damage to the automatic cleaning apparatus. The aforementioned "front" refers to a side that is the same as a traveling direction of the automatic cleaning apparatus, and the aforementioned "rear" refers to a side that is opposite to the traveling direction of the automatic cleaning apparatus.

The position determination device 121 includes, but is not limited to, a camera, a Laser Distance Sensor (LDS), and a line structured light device. The camera and the line structured light device may be disposed as required at any position of the front or side surface of the cleaning apparatus.

Various components in the perception system 120 may operate independently, or operate together to achieve a target function more accurately. The surface to be cleaned is identified by the cliff sensors 123 and the ultrasonic sensor to determine physical properties of the surface to be cleaned, including a surface material, a degree of cleanliness, and the like. The determination may be made more accurately in combination with the camera, the LDS, or the like.

For example, the ultrasonic sensor may determine whether the surface to be cleaned is a carpet. If the ultrasonic sensor determines that the surface to be cleaned is made of a carpet material, the control system 130 controls the automatic cleaning apparatus to perform cleaning in a carpet mode.

The forward portion 111 of the mobile platform 100 is provided with the buffer 122. During cleaning, when the driving wheel assembly 141 propels the automatic cleaning apparatus to travel on the ground, the buffer 122 monitors one or more events (or objects) in a traveling path of the automatic cleaning apparatus via a sensor system, e.g., an infrared sensor, and the automatic cleaning apparatus may control the driving wheel assembly 141 based on the event (or object), such as obstacle and wall, detected by the buffer 122, so that the automatic cleaning apparatus is caused to respond to the event (or object), for example, to move away from the obstacle.

The control system 130 is disposed on a main circuit board in the mobile platform 100, and includes a computing processor such as a central processing unit and an application processor, that communicates with a non-transitory memory such as a hard disk, a flash memory, and a random-access memory. The application processor is configured to: receive environmental information sensed by the plurality of sensors and transmitted from the perception system 120; generate a simultaneous map of an environment where the automatic cleaning apparatus is located using a positioning algorithm e.g., simultaneous localization and mapping (SLAM), based on obstacle information fed back by the LDS; autonomously determine a traveling path based on the environmental information and the environmental map; and then control the driving system 140 to perform operations, such as traveling forward, traveling backward, and/or steering, based on the autonomously determined traveling path. Further, the control system 130 may also determine whether to activate the cleaning module 150 to perform a cleaning operation based on the environmental information and the environmental map.

In some embodiments, the control system 130 may, based on distance information and speed information which are fed back by the buffer 122, the cliff sensors 123, and the sensing devices such as the ultrasonic sensor, the infrared sensor, the magnetometer, the accelerometer, the gyroscope, and the odometer, comprehensively determine a current operation state of the ground-sweeping robot, such as crossing over a threshold, getting on a carpet, locating at an edge of a cliff, being stuck from above or below, having a full dust box, or being picked up. The control system 130 may also give specific next-step strategies for different situations, so that the operation of the automatic cleaning apparatus is more in line with requirements of an owner, and a better user experience is provided. Further, the control system may plan the most efficient and reasonable cleaning path and cleaning mode based on the simultaneous map generated by the SLAM, thereby greatly improving the cleaning efficiency of the automatic cleaning apparatus.

The driving system 140 may execute a driving command based on specific distance and angle information, such as x, y, and 0 components, so as to manipulate the automatic cleaning apparatus to travel across the ground. The driving system 140 includes the driving wheel assembly 141, and may control a left wheel and a right wheel simultaneously. In order to control the motion of the automatic cleaning apparatus more precisely, the driving system 140 preferably includes a left driving wheel assembly and a right driving wheel assembly. The left driving wheel assembly and the right driving wheel assembly are arranged symmetrically along a transversal axis defined by the mobile platform 100.

In order for the automatic cleaning apparatus to move on the ground more stably or have stronger movement ability, the automatic cleaning apparatus may include one or more steering assemblies 142. The steering assembly 142 may be a driven wheel or a driving wheel, and structurally includes, but is not limited to, a universal wheel. The steering assembly 142 may be located in front of the driving wheel assembly 141.

The driving wheel assembly 141 may be detachably connected to the mobile platform 100 to facilitate assembly, disassembly and maintenance. The driving wheel may have an offset drop type of suspension system that is movably fastened, e.g., rotatably attached, to the mobile platform 100 of the automatic cleaning apparatus, and maintains contact and traction with the ground by an elastic element such as a tension spring or a compression spring with a certain grounding force. In the meanwhile, the cleaning module 150 of the automatic cleaning apparatus is also in contact with the surface to be cleaned with a certain pressure.

The energy system 160 includes a rechargeable battery, such as a nickel-hydride battery and a lithium battery. The rechargeable battery may be connected with a charging control circuit, a battery pack charging temperature detecting circuit, and a battery undervoltage monitoring circuit. The charging control circuit, the battery pack charging temperature detecting circuit, and the battery undervoltage monitoring circuit are then connected to a single-chip micro-computer control circuit. A host of the automatic cleaning apparatus is connected to a charging pile through a charging electrode disposed on a side of or below a body of the automatic cleaning apparatus for the purpose of charging. If there is dust on an exposed charging electrode, a plastic body around the electrode may be melted and deformed due to a cumulative effect of charge in a charging process, and even the electrode itself may be deformed, making it impossible to continue normal charging.

The human-computer interaction system 170 includes buttons that are on a panel of the host and used by a user to select functions. The human-computer interaction system 170 may further include a display screen and/or an indicator light and/or a horn that present a current state or function item of the automatic cleaning apparatus to the user. The human-computer interaction system 17 may further include a mobile client program. For a route navigation type of cleaning apparatus, a mobile client may present, to the user, a map of the environment where the apparatus is located and a position of the apparatus, which may provide richer and more user-friendly function items to the user.

The cleaning module 150 may include a dry cleaning module 151 and/or a wet cleaning module 400.

As shown in FIG. 2, the dry cleaning module 151 includes a rolling brush, a dust box, a blower, and an air outlet. The rolling brush having a certain interference with the ground sweeps up garbage on the ground, and rolls up the garbage to the front of a dust suction inlet between the rolling brush and the dust box. Then, the garbage is sucked into the dust box by air having a suction force, which is generated by the blower and passes through the dust box. A dust removal capacity of the ground-sweeping robot may be characterized by a dust pickup efficiency (DPU) of the garbage. The DPU is affected by a structure and material of the rolling brush, by a utilization rate of the air in an air channel that is formed by the dust suction inlet, the dust box, the blower, the air outlet, and connection components between the four, and by a type and power of the blower, which is a complex systematic design problem. Compared to an ordinary plug-in vacuum cleaner, the improvement on the dust removal capacity is more meaningful for an automatic cleaning apparatus with limited energy, because the improvement on the dust removal capacity directly and effectively reduces requirements for energy. That is, the original cleaning apparatus that may clean 80 square meters of the ground on a single charge may be evolved to clean 180 square meters or more on a single charge. Furthermore, the service life of the battery with the reduced number of charging times will also be greatly increased, so that the frequency for replacing the battery by the user will also be decreased. More intuitively and importantly, the improvement on the dust removal capacity is the most obvious and important user experience, as the user will directly determine whether the thorough cleaning is achieved. The dry cleaning module may further include a side brush 152 having a rotary shaft which is angled relative to the ground, for moving debris into a region of the rolling brush of the cleaning module 150.

The wet cleaning module 400 provided in embodiments of the present disclosure is configured to clean at least a part of the operation surface by means of wet cleaning. The wet cleaning module 400 includes a cleaning head 410 and a driving unit. The cleaning head 410 is used for cleaning at least a part of the operation surface, and the driving unit is used for driving the cleaning head to substantially reciprocate along a target surface, the target surface being a part of the operation surface. The cleaning head 410 reciprocates along a surface to be cleaned, and a surface of the cleaning head 410 in contact with the surface to be cleaned is provided with a cleaning cloth or a cleaning plate, which generates a high-frequency friction relative to the surface to be cleaned through reciprocating motion, thereby removing stains on the surface to be cleaned. The cleaning head 410 includes a movable region 412 and a fixed region 411. The movable region 412 is disposed approximately at a center of the cleaning head 410.

Figure 3:
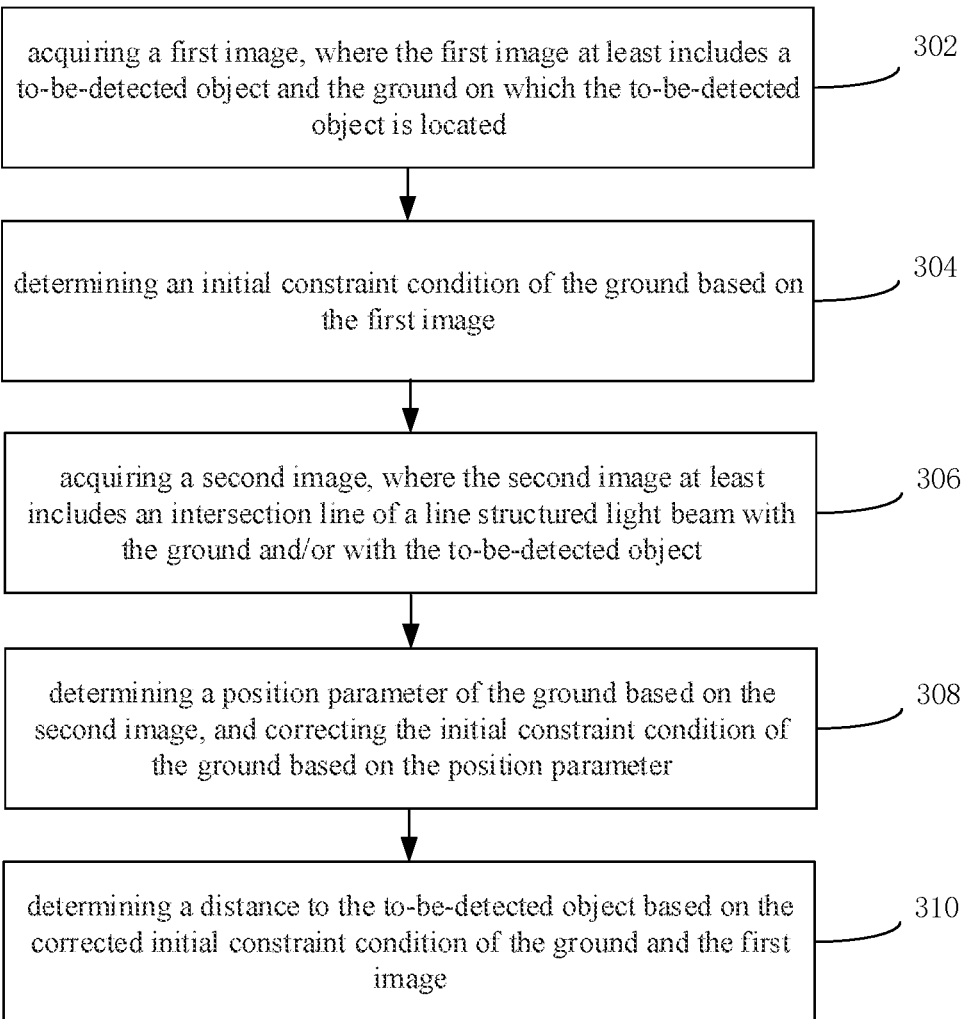
FIG. 3 is a schematic flowchart of a distance measurement method of a self-moving robot provided by an embodiment of the present disclosure.

As shown in FIG. 3, as one of implementations, an embodiment of the present disclosure provides a distance measurement method, which is applied to a self-moving robot equipped with an image acquisition device, including the following steps.

Step S302, acquiring a first image, where the first image at least includes a to-be-detected object and the ground on which the to-be-detected object is located.

Figure 4:
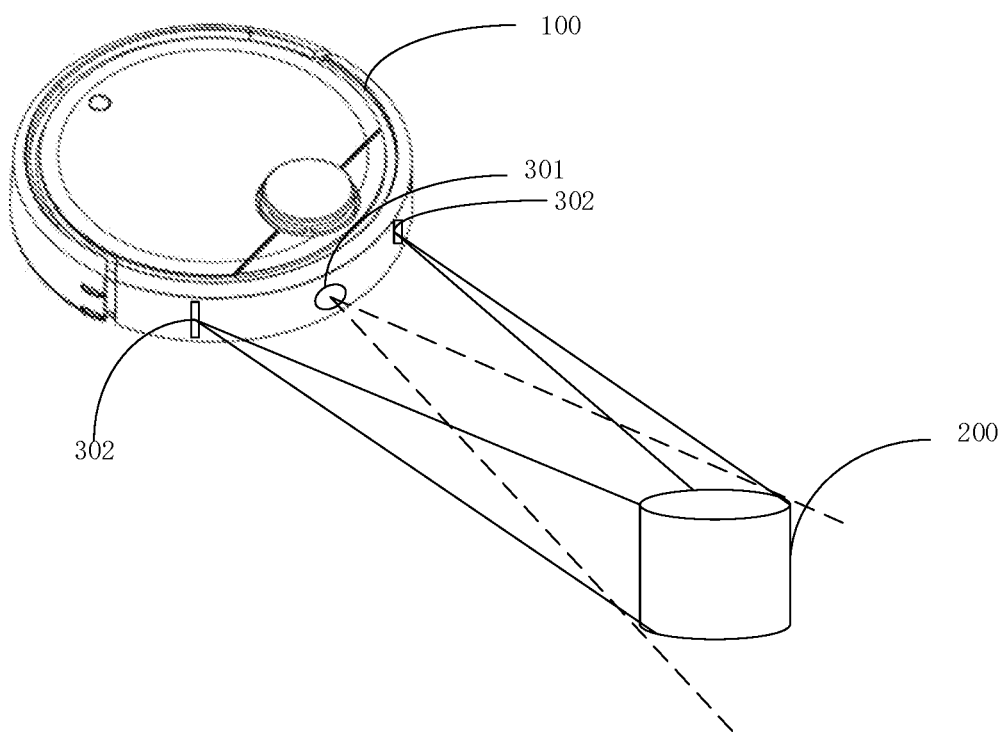
FIG. 4 is a schematic diagram of an image acquisition process of a self-moving robot provided by an embodiment of the present disclosure.

The first image is acquired by a first image acquisition device 301. The first image acquisition device 301 is shown in FIG. 4. The first image acquisition device 301 includes, but not limited to, an infrared image acquisition device or a visible light image acquisition device, such as a visible light or infrared camera, an infrared structured light image acquisition device, or the like. The first image acquisition device 301 is disposed at a front end of the self-moving robot, and is used to acquire a field of view image within a visible range along a traveling trajectory of the self-moving robot in real time, and send the front field of view image to a control system. The control system gives an analysis result about the field of view image based on an operation result of the self-moving robot or from a remote end, and then controls a driving system to perform obstacle avoidance or another operation.

The to-be-detected object 200 refers to any obstacle that the self-moving robot encounters in a traveling process. The self-moving robot may perform classification training on relevant classes of obstacles in advance, and store a trained model in its own storage system or a remote storage system. When obtaining an obstacle image during operation, the self-moving robot may call the model stored in the storage system in advance to determine class information of a current obstacle, and perform a relevant operation according to the class information. It is noted that, in the foregoing step, identifying the to-be-detected object 200 may also be understood as detecting the presence of an obstacle encountered during traveling, without identifying its class.

Figure 5:
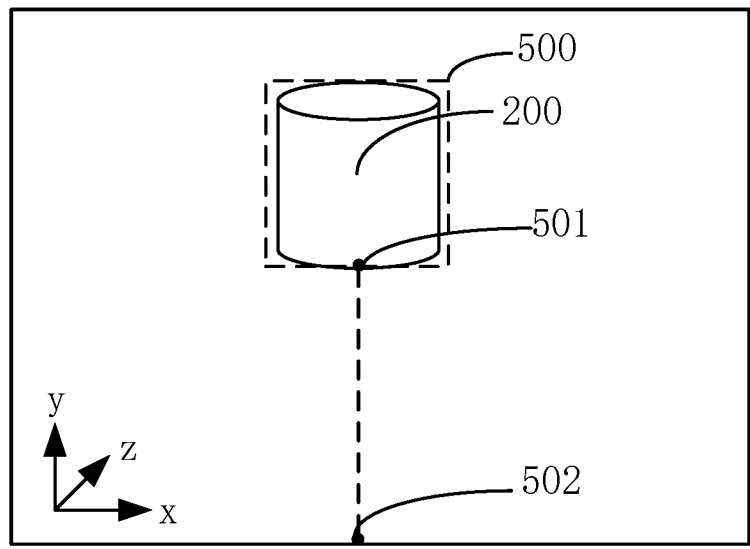
FIG. 5 is a schematic diagram of a first image obtained by a self-moving robot provided by an embodiment of the present disclosure.

As shown in FIG. 5, an image obtained by the first image acquisition device 301 at the front end of the self-moving robot includes an image of the to-be-detected object 200 on the ground and other scene images in a front field of view relative to the first image acquisition device 301. Because the first image acquisition device 301 is located in front of the self-moving robot and has a low height from the ground, the field of view image includes a ground image from the first image acquisition device 301 to the to-be-detected object 302.

Step S304, determining an initial constraint condition of the ground based on the first image.

The positions of the first image acquisition device 301 and the self-moving robot are relatively fixed. After position coordinates of the self-moving robot are determined, position coordinates of the first image acquisition device 301 may be determined. For example, after constructing a three-dimensional or two-dimensional coordinate system using a cleaning region as a map, the position coordinates of the self-moving robot may be determined based on the traveling trajectory of the self-moving robot, and then the position coordinates of the first image acquisition device 301 may be determined. After being fixed on the self-moving robot, the first image acquisition device 301 has relatively fixed position parameters, including but not limited to a height above the ground, a pitch angle, a roll angle, a yaw angle, and the like. At least one of the foregoing parameters constitutes the initial constraint condition of the ground. As shown in FIG. 5, when the first image is acquired by the first image acquisition device 301, the first image acquisition device 301 may be in a horizontal direction or a certain pitch angle relative to the ground, or have an initial position parameter such as a lateral offset angle, or the like. By determining the initial constraint condition of the ground, the first image acquired by the first image acquisition device 301 has a benchmark image quality. When the self-moving robot does not bump, a distance from an obstacle to the cleaning apparatus may be determined by using the benchmark first image.

Step S306, acquiring a second image, where the second image at least includes an intersection line of a line structured light beam with the ground and/or with the to-be-detected object.

The second image is acquired by a second image acquisition device 302. The second image acquisition device 302 is an infrared image acquisition device. The second image acquisition device 302 includes an infrared line structured light source and a camera for capturing an infrared image.

Figure 6:
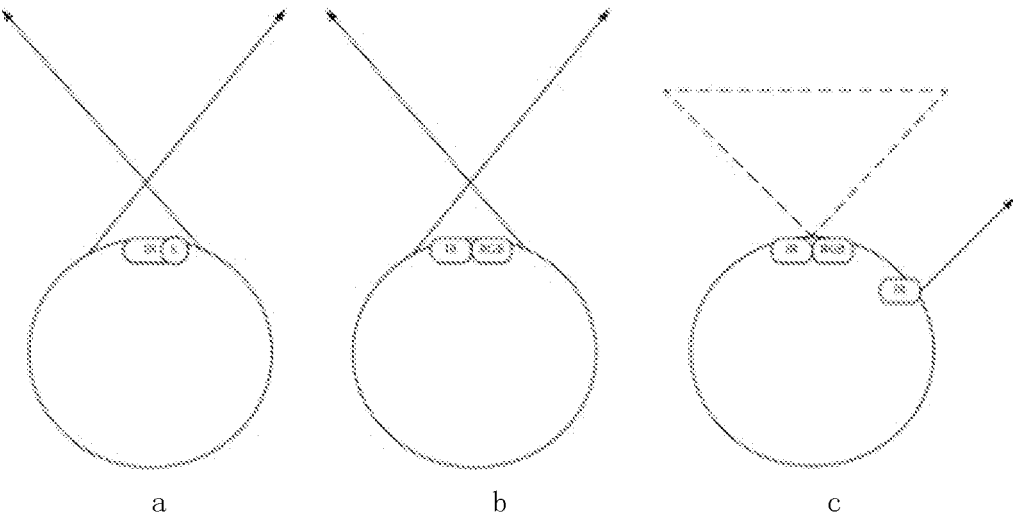
FIG. 6 is a schematic structural diagram of a camera device of a self-moving robot provided by an embodiment of the present disclosure.

At least one surface-scanning light beam that is not parallel to the ground is emitted by a line structured light source, so that the surface-scanning light beam forms at least one intersection line with the ground. For example, in some embodiments, as shown in FIG. 6b, at least two surface-scanning light beams perpendicular to the ground are alternately emitted by the line structured light source, so that the surface-scanning light beams form at least two intersection lines with the ground. The surface-scanning light beams of the line structured light source perpendicular to the ground can reduce the scattering of the structured light beam after contacting an obstacle, thereby making an image of the line structured light beam obtained by the second image acquisition device clearer, and making the distance measurement more accurate.

Alternatively, one transverse surface-scanning light beam that is not parallel to the ground and one surface-scanning light beam that is perpendicular to the ground are emitted by the line structured light source, so that the surface-scanning light beams form at least two intersection lines with the ground, as shown in FIG. 6c. The transverse surface-scanning light beam that is not parallel to the ground can increase a range of the line structured light beam to detect obstacle, thereby overcoming the disadvantage that an detection range inherent in the line structured light beam is narrow. The surface-scanning light beam that is perpendicular to the ground can increase the requirement for detecting a height of an obstacle, and cooperate with the true translation transverse line structured light beam to increase the transverse and vertical ranges of obstacle detection.

In some embodiments, emitting one transverse surface-scanning light beam that is not parallel to the ground and one surface-scanning light beam that is perpendicular to the ground by the line structured light source enables the surface-scanning light beams to form at least two intersection lines with the ground, which includes details as follows.

One transverse surface-scanning light beam that is not parallel to the ground is emitted toward a traveling direction of the self-moving robot by the line structured light source; and one surface-scanning light beam that is perpendicular to the ground is emitted toward a side direction in traveling of the self-moving robot, where the surface-scanning light beams form at least two intersection lines with the ground, as shown in FIG. 6c. By emitting one transverse surface-scanning light beam that is not parallel to the ground toward the traveling direction of the self-moving robot, the obstacle detection range having the maximum width in the traveling direction of the robot is ensured to the maximum extent. At the same time, by emitting one surface-scanning light beam that is perpendicular to the ground toward the side direction in traveling of the self-moving robot, detection of obstacles (for example, a wall) in a side direction of the robot can be increased, so that when the robot travels along a wall, a distance between the robot and the wall can be effectively controlled, thereby ensuring cleaning without dead angles.

In some embodiments, emitting one surface-scanning light beam that is perpendicular to the ground toward the side direction in traveling of the self-moving robot includes: emitting one surface-scanning light beam that is perpendicular to the ground toward a downward direction relative to the traveling direction of the self-moving robot. This enables the robot to detect short-range obstacles more accurately, and combines the advantages of the first image acquisition device for detecting long-range obstacles, so that the robot can simultaneously ensure its detection of both long-range and short-range obstacles.

In some embodiments, as shown in FIG. 6a, the first image acquisition device and the second image acquisition device are the same infrared image acquisition device. That is, the functions of the above two image acquisition devices may be completed by using the same infrared image acquisition device. An infrared light source is controlled to respectively emit an infrared light beam in different periods of time. A shooting time sequence is controlled, and the first image and the second image are respectively obtained in different periods of time by the same infrared image acquisition device. Specifically, for example, through a control logic for time-division acquisition, the image acquisition device may acquire an infrared image of an obstacle at a moment t1, and a distance measurement calculation is performed by using the obtained first image in a monocular distance measurement mode; and the image acquisition device may acquire a second image of the obstacle by the line structured light beam at a moment t2, and distance measurement by the first image and calibration by the second image are combined to obtain more accurate distance measurement information.

Step S308, determining a position parameter of the ground based on the second image, and correcting the initial constraint condition of the ground based on the position parameter.

Figure 7:
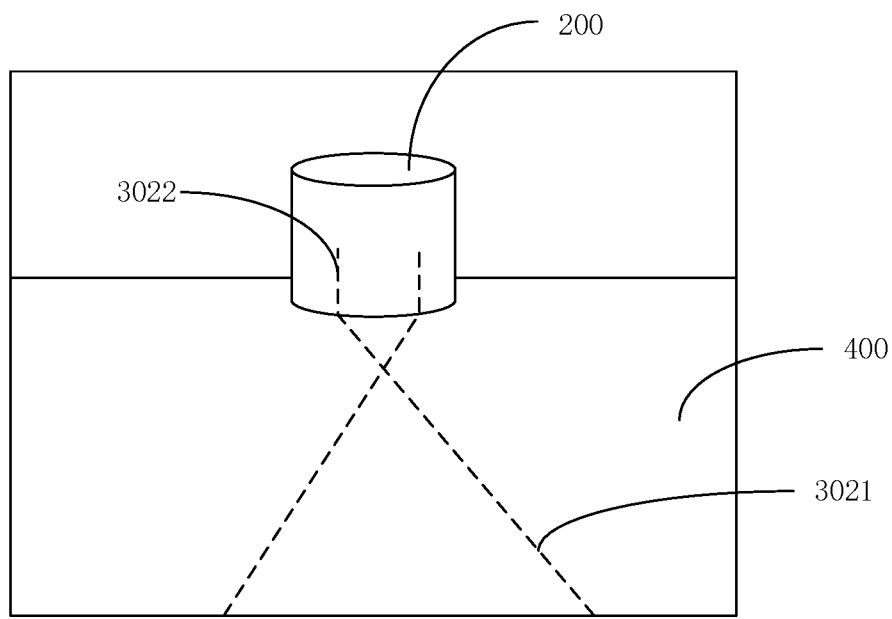
FIG. 7 is a schematic diagram of a second image obtained by a self-moving robot provided by an embodiment of the present disclosure.

As discussed above, as shown in FIG. 7, an image of an intersection line 3021 of the line structured light beam and the ground is acquired by the second image acquisition device, and each intersection line satisfies a straight line equation in a three-dimensional coordinate system, Ax+By+Cz+D=0. According to the principle of determining a plane by two intersecting or non-intersecting straight lines, an equation that the ground 400 satisfies in the current second image may be calculated through images and equations of the two ground straight lines 3021 acquired in the second image, so that the ground parameter can be calculated according to the second image, and then the initial constraint condition of the ground is correct. That is, initial parameters including but not limited to a height above ground, a pitch angle, a roll angle, a yaw angle, and the like in the first image are corrected through parameters including but not limited to a height above ground, a pitch angle, a roll angle, a yaw angle, and the like that are obtained through calculation of the second image, so that a monocular distance measurement result is more accurate through the correction by the line structured light beam, thereby overcoming an error caused by the robot's bumping.

In some embodiments, the determining a position parameter of the ground based on the second image includes: acquiring point cloud data for structured light based on the intersection line 3022 of the line structured light beam with the to-be-detected object 200; filtering the point cloud data for structured light based on the initial constraint condition of the ground; fitting the filtered point cloud data for structured light to obtain a ground equation; and determining the position parameter of the ground by using the ground equation.

In some embodiments, the determining a position parameter of the ground based on the second image includes: fitting the intersection line 3021 between the line structured light beam with the ground; determining a ground equation according to at least two fitted intersection lines with the ground; and determining the position parameter of the ground by using the ground equation.

Step S310, determining a distance to the to-be-detected object based on the corrected initial constraint condition of the ground and the first image.

In some embodiments, the determining a distance to the to-be-detected object based on the corrected initial constraint condition of the ground and the first image includes:

determining an object region of the to-be-detected object in the first image, where the object region is the smallest rectangle including the to-be-detected object; determining a lower edge position parameter of the object region and a lower edge position parameter of the first image based on the corrected initial constraint condition of the ground; and determining the distance to the to-be-detected object based on the lower edge position parameter of the object region and the lower edge position parameter of the first image.

In some embodiments, the determining the distance to the to-be-detected object based on the lower edge position parameter of the object region and the lower edge position parameter of the first image includes.

determining a reference position as an origin of coordinate in the first image; selecting any point in a lower edge of the smallest rectangle as a first reference point; determining a second reference point in a lower edge of the first image according to the first reference point; and calculating the distance to the to-be-detected object based on position coordinates of the first reference point and the second reference point.

Specifically, the method for determining a distance of the to-be-detected object 200 relative to the self-moving robot includes: acquiring an image of the to-be-detected object 200 on the ground by the first image acquisition device 301 at the front end of the self-moving robot, and constructing a corresponding object region (region of interest, ROI) based on the to-be-detected object 200, where an object region 500 just envelops the to-be-detected object 200. As an example, the object region 500 is the smallest rectangle including the to-be-detected object. It is noted that, the object region may be other shapes such as a circumscribing circle, an ellipse, any specific shape, or the like other than the smallest rectangle. When selecting the smallest rectangle as a circumscribing region, any point on the lower edge may be conveniently selected to calculate a first distance.

According to an implementation in some embodiments, as shown in FIG. 5, an example in which the object region is the smallest rectangle is described. The method for determining a distance to the to-be-detected object based on the lower edge position of the object region and the lower edge position of the first image includes the following sub-steps, as shown in FIG. 5.

Step S3102, determining a reference position as an origin of coordinates in the first image.

As shown in FIG. 5, a lower left corner of the first image may be selected as the origin of coordinates, a horizontal direction may be selected as an x direction, a vertical direction may be selected as a y direction, and a direction perpendicular to the image may be selected as a z direction. It is noted that, the selected position of the origin of coordinates of the image is not unique, and may be arbitrarily selected according to the needs of data analysis.

Step S3104, as an implementation, selecting any point in a lower side of the smallest rectangle as a first reference point 501, and determining a second reference point 502 on a lower edge of the first image based on the first reference point.

The selection of the first reference point 501 is to select any point in a lower side of the smallest rectangle. If the object region is a circle, the lowest point is selected as the first reference point. The second reference point 502 is a point at which a line extending vertically downward from the first reference point 501 intersects with the lower edge of the first image, that is, the lowermost point in the first image representing the ground on the first image. In this way, a distance between the to-be-detected object and the camera can be calculated from a position relationship between the first reference point 501 and the second reference point 502. That is, the distance between the to-be-detected object and the camera is obtained based on a ground distance.

Step S3106, calculating the first distance to the to-be-detected object based on position coordinates of the first reference point and the second reference point.

For example, if coordinates of the first reference point 501 are (x1, y1), and coordinates of the second reference point 502 are (x2, y2), a distance between the first reference point 501 and the second reference point 502 may be calculated. In another example, a pixel position of the first reference point 501 and a pixel position of the second reference point 502 are obtained by analyzing a pixel relationship, so as to estimate a pixel distance between the first reference point 501 and the second reference point 502. Then, according to an actual height of the to-be-detected object and the pixel relationship, an actual distance between the first reference point 501 and the second reference point 502 is determined.

In the distance measurement method, a monocular distance measurement method and a dual-line structured light distance measurement method are combined. On one hand, correcting the position parameter of the ground by the line structured light beam can effectively solve the impact of bumpy ground on monocular distance measurement; and on the other hand, combining the advantages of monocular distance measurement can effectively improve the disadvantage that the dual-line structured light distance measurement has a small range and is limited to a dual-line plane. In addition, the method for locating ground with a line structured light beam can effectively improve the accuracy of monocular distance measurement and better satisfies an overall distance measurement requirement of the robot.

Figure 8:
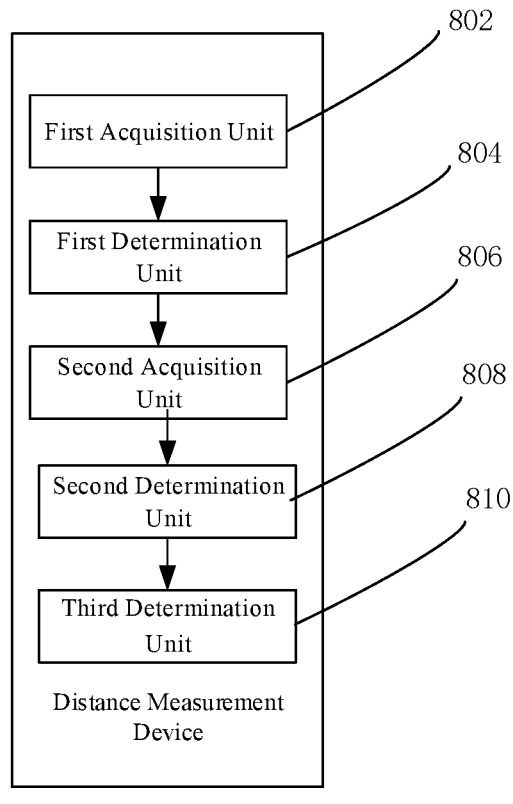
FIG. 8 is a schematic structural diagram of a distance measurement device of a self-moving robot provided by an embodiment of the present disclosure.

An embodiment of the present disclosure further provides a distance measurement device, which is applied to a self-moving robot equipped with an image acquisition device. The units perform the method steps described in the foregoing embodiments. The same method steps have the same technical effects, and will not be repeated here. As shown in FIG. 8, the distance measurement device specifically includes:

a first acquisition unit 802, configured to acquire a first image, where the first image at least includes a to-be-detected object and the ground on which the to-be-detected object is located;

a first determination unit 804, configured to determine an initial constraint condition of the ground based on the first image;

a second acquisition unit 806, configured to acquire a second image, where the second image at least includes two intersection lines of a line structured light beam with the ground and/or with the to-be-detected object;

a second determination unit 808, configured to determine a position parameter of the ground based on the second image, and correct the initial constraint condition of the ground based on the position parameter; and a third determination unit 810, configured to determine a distance to the to-be-detected object based on the corrected initial constraint condition of the ground and the first image.

The second image is acquired by a second image acquisition device 302. The second image acquisition device 302 is an infrared image acquisition device. The second image acquisition device 302 includes an infrared line structured light source and a camera for acquiring an infrared image.

The second acquisition unit 806 is configured to emit at least one surface-scanning light beam that is not parallel to the ground by a line structured light source, so that the surface-scanning light beam forms at least one intersection line with the ground. For example, in some embodiments, as shown in FIG. 6b, the line structured light source alternately emits at least two surface-scanning light beams perpendicular to the ground, so that the surface-scanning light beams form at least two intersection lines with the ground. The surface-scanning light beams of the line structured light source perpendicular to the ground can reduce the scattering of the structured light beam after contacting an obstacle, thereby making an image of the line structured light beam obtained by the second image acquisition device clearer, and making the distance measurement more accurate.

Alternatively, the line structured light source emits one transverse surface-scanning light beam that is not parallel to the ground and one surface-scanning light beam that is perpendicular to the ground, so that the surface-scanning light beams form at least two intersection lines with the ground, as shown in FIG. 6c. The transverse surface-scanning light beam that is not parallel to the ground can increase a range of the line structured light beam to detect obstacles, thereby overcoming the disadvantage that a detection range inherent in the line structured light beam is narrow. The surface-scanning light beam that is perpendicular to the ground can increase the requirement for detecting a height of an obstacle, and cooperate with the transverse line structured light beam to increase the transverse and vertical ranges of obstacle detection.

In some embodiments, emitting one transverse surface-scanning light beam that is not parallel to the ground and one surface-scanning light beam that is perpendicular to the ground by the line structured light source enables the surface-scanning light beams to form at least two intersection lines with the ground, which includes details as follows.

One transverse surface-scanning light beam that is not parallel to the ground is emitted toward a traveling direction of the self-moving robot by the line structured light source; and one surface-scanning light beam that is perpendicular to the ground is emitted toward a side direction in traveling of the self-moving robot, where the surface-scanning light beams form at least two intersections with the ground, as shown in FIG. 6c. By emitting one transverse surface-scanning light beam that is not parallel to the ground toward the traveling direction of the self-moving robot, the obstacle detection range having the maximum width in the traveling direction of the robot is ensured to the maximum extent. At the same time, by emitting one surface-scanning light beam that is perpendicular to the ground toward the side direction in traveling of the self-moving robot, detection of obstacles (for example, a wall) in a side direction of the robot can be increased, so that when the robot travels along a wall, a distance between the robot and the wall can be effectively controlled, thereby ensuring cleaning without dead angles.

In some embodiments, emitting one surface-scanning light beam that is perpendicular to the ground toward the side direction in traveling of the self-moving robot includes: emitting one surface-scanning light beam that is perpendicular to the ground toward a downward direction relative to the traveling direction of the self-moving robot. This enables the robot to detect short-range obstacles more accurately, and combines the advantages of the first image acquisition device for detecting long-range obstacles, so that the robot can simultaneously ensure its detection of both long-range and short-range obstacles.

In some embodiments, as shown in FIG. 6a, the first image acquisition device and the second image acquisition device are the same infrared image acquisition device. That is, the functions of the above two image acquisition devices may be completed by using the same infrared image acquisition device. An infrared light source is controlled to respectively emit an infrared light beam in different periods of time. A shooting time sequence is controlled, and the first image and the second image are respectively obtained in different periods of time by the same infrared image acquisition device. Specifically, for example, through a control logic for time-division acquisition, the image acquisition device may acquire an infrared image of an obstacle at a moment t1, and a distance measurement calculation is performed by using the obtained first image in a monocular distance measurement mode; and the image acquisition device may acquire a second image of the obstacle by a line structured light beam at a moment t2, and distance measurement by the first image and calibration by the second image are combined to obtain more accurate distance measurement information.

The third determination unit 810 is configured to determine a position parameter of the ground based on the second image, which includes: acquiring point cloud data for structured light based on the intersection line 3022 of the line structured light beam with the to-be-detected object 200; filtering the point cloud data for structured light through the initial constraint condition of the ground; fitting the filtered point cloud data for structured light to obtain a ground equation; and determining the position parameter of the ground by using the ground equation.

The third determination unit 810 is configured to determine a position parameter of the ground based on the second image, which includes: fitting the intersection line 3021 of the line structured light beam with the ground; determining a ground equation according to at least two fitted intersection lines with the ground; and determining the position parameter of the ground by using the ground equation.

In some embodiments, determining the distance to the to-be-detected object based on the corrected initial constraint condition of the ground and the first image includes:
  determining an object region of the to-be-detected object in the first image, where the object region is the smallest rectangle including the to-be-detected object; determining a lower edge position parameter of the object region and a lower edge position parameter of the first image based on the corrected initial constraint condition of the ground; and determining the distance to the to-be-detected object based on the lower edge position parameter of the object region and the lower edge position parameter of the first image.

In some embodiments, determining the distance to the to-be-detected object based on the lower edge position parameter of the object region and the lower edge position parameter of the first image includes:
  determining a reference position as an origin of coordinates in the first image; selecting any point in a lower edge of the smallest rectangle as a first reference point, and determining a second reference point in a lower edge of the first image based on the first reference point; and calculating the distance to the to-be-detected object based on position coordinates of the first reference point and the second reference point.

In some embodiments, the third determination unit 810 is configured to determine a reference position as an origin of coordinates in the first image; select any point in a lower side of the smallest rectangle as a first reference point 501, and determine a second reference point 502 on a lower edge of the first image based on the first reference point; and calculate the first distance to the to-be-detected object based on position coordinates of the first reference point and the second reference point.

In the distance measurement device, a monocular distance measurement method and a dual-line structured light distance measurement method are combined. On one hand, correcting the position parameter of the ground by the line structured light beam can effectively solve the impact of bumpy ground on monocular distance measurement; and on the other hand, combining the advantages of monocular distance measurement can effectively improve the disadvantage that the dual-line structured light distance measurement has a small range and is limited to a dual-line plane. In addition, the method for locating ground with a line structured light beam can effectively improve the accuracy of monocular distance measurement and better satisfies an overall distance measurement requirement of the robot.

An embodiment of the present disclosure provides a non-transitory computer-readable storage medium, having computer program instructions stored thereon, where the computer program instructions, when called and executed by a processor, implement the steps of any one of the above methods.

An embodiment of the present disclosure provides a robot, including a processor and a memory. The memory stores computer program instructions executable by the processor. When executing the computer program instructions, the processor implements the method steps of any one of the foregoing embodiments.

Figure 9:
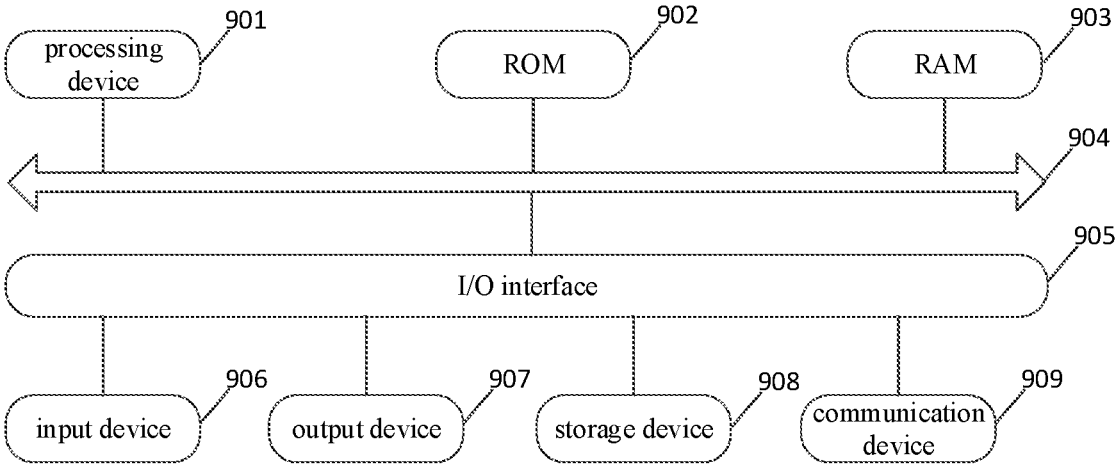
FIG. 9 is a schematic diagram of an electronic structure of a robot provided by an embodiment of the present disclosure.

As shown in FIG. 9, the robot may include a processing device (such as a central processing unit, a graphics processing unit, or the like) 901 that may perform various appropriate operations and processing according to a program stored in a read-only memory (ROM) 902 or a program loaded from a storage 908 into a random-access memory (RAM) 903. In the RAM 903, various programs and data required for operation of the electronic robot 900 are also stored. The processing device 901, ROM 902, and RAM 903 are connected to each other via a bus 904. An input/output (110) interface 905 is also connected to the bus 904.

Generally, the following devices may be connected to the I/O interface 905; input devices 906 including, for example, a touchscreen, a touchpad, a keyboard, a mouse, a camera, a microphone, an accelerometer, a gyroscope, etc.; output devices 907 including, for example, a Liquid Crystal Display (LCD), a loudspeaker, a vibrator, etc.; a storage 908 including, for example, a hard disk; and a communications device 909. The communications device 909 may allow the electronic robot to communicate wirelessly or by wire with other robots to exchange data. Although FIG. 9 shows an electronic robot with various means, it should be understood that it is not required to implement or provide all shown means. Alternatively, more or fewer means may be implemented or provided.

Flowcharts and block diagrams in the accompanying drawings illustrate architecture, functionality, and operation of possible implementations of systems, methods, and computer program products according to various embodiments of the present disclosure. In this regard, each block in a flowchart or block diagram may represent a module, a program segment, or a part of codes that includes one or more executable instructions for implementing a specified logical function. It should also be noted that in some alternative implementations, functions marked in the blocks may also occur in different order than those marked in the accompanying drawings. For example, two blocks represented in succession may actually be executed in substantially parallel, and they may sometimes be executed in a reverse order, depending on the functions involved. It should also be noted that each block in the block diagram and/or flowchart and a combination of blocks in the block diagram and/or flowchart may be implemented by using a dedicated hardware-based system that performs a specified function or operation, or may be implemented by using a combination of dedicated hardware and computer instructions.

Finally, it should be noted that various embodiments in the description are described in a progressive manner, each embodiment focuses on the differences from other embodiments, and the same or similar parts among these various embodiments may refer to one another. Since the system or device disclosed in the embodiments corresponds to the method disclosed in the embodiments, the description thereof is relatively simple, and the relevant parts may refer to the description of the method part.

The above embodiments are only used to illustrate the technical solutions of the present disclosure, but are not intended to limit thereto. Although the present disclosure has been described in detail with reference to the foregoing embodiments, those of ordinary skills in the art should understand that, they can still make modifications to the technical solutions described in the foregoing embodiments or make equivalent substitutions to some of the technical features; and these modifications or substitutions do not cause the essence of the corresponding technical solutions deviate from the spirit and scope of the technical solutions of the various embodiments of the present disclosure.

All embodiments of the present disclosure may be performed alone or in combination with other embodiments, all of which is considered as falling within the scope of protection claimed by the present disclosure.

What is claimed is:

1. A distance measurement method, applied to a self-moving robot equipped with an image acquisition device, and comprising steps of:

acquiring a first image, wherein the first image at least comprises a to-be-detected object and a ground on which the to-be-detected object is located;

determining an initial constraint condition of the ground based on the first image;

acquiring a second image, wherein the second image at least comprises an intersection line of a line structured light beam with at least one of the ground and the to-be-detected object;

determining a position parameter of the ground based on the second image, and correcting the initial constraint condition of the ground based on the position parameter; and determining a distance to the to-be-detected object based on the corrected initial constraint condition of the ground and the first image;

wherein, before the step of acquiring the second image, the method comprises a step of:

emitting at least one surface-scanning light beam that is not parallel to the ground by a line structured light source, the surface-scanning light beam forming at least one intersection line with the ground.

2. The method according to claim 1, wherein the step of emitting at least one surface-scanning light beam that is not parallel to the ground by the line structured light source, the surface-scanning light beam forming at least one intersection line with the ground, comprises a sub-step of:

alternately emitting at least two surface-scanning light beams that are perpendicular to the ground by the line structured light source, the surface-scanning light beams forming at least two intersection lines with the ground; or emitting one transverse surface-scanning light beam that is not parallel to the ground and one surface-scanning light beam that is perpendicular to the ground by the line structured light source, the surface-scanning light beams forming at least two intersection lines with the ground.

3. The method according to claim 2, wherein the step of emitting one transverse surface-scanning light beam that is not parallel to the ground and one surface-scanning light beam that is perpendicular to the ground by the line structured light source, the surface-scanning light beams forming at least two intersection lines with the ground, comprises sub-steps of:

emitting one transverse surface-scanning light beam that is not parallel to the ground toward a traveling direction of the self-moving robot by the line structured light source; and emitting one surface-scanning light beam that is perpendicular to the ground toward a side direction in traveling of the self-moving robot, wherein the surface-scanning light beams form the at least two intersection lines with the ground.

4. The method according to claim 3, wherein the step of emitting one surface-scanning light beam that is perpendicular to the ground toward the side direction in traveling of the self-moving robot comprises a sub-step of:

emitting one surface-scanning light beam that is perpendicular to the ground toward a downward direction relative to the traveling direction of the self-moving robot.

5. The method according to claim 1, wherein an image acquisition device for acquiring the first image is an infrared image acquisition device or a visible light image acquisition device; and an image acquisition device for acquiring the second image is an infrared image acquisition device.

6. The method according to claim 5, wherein the first image acquisition device and the second image acquisition device are the same infrared image acquisition device.

7. The method according to claim 6, further comprising steps of:

controlling an infrared light source to respectively emit an infrared light beam in different periods of time; and controlling a shooting time sequence to respectively obtain the first image and the second image in different periods of time by the same infrared image acquisition device.

8. The method according to claim 1, wherein the step of determining the distance to the to-be-detected object based on the corrected initial constraint condition of the ground and the first image comprises sub-steps of:

determining an object region of the to-be-detected object in the first image, wherein the object region is the smallest rectangle comprising the to-be-detected object;

determining a lower edge position parameter of the object region and a lower edge position parameter of the first image based on the corrected initial constraint condition of the ground; and determining the distance to the to-be-detected object based on the lower edge position parameter of the object region and the lower edge position parameter of the first image.

9. The method according to claim 8, wherein the step of determining the distance to the to-be-detected object based on the lower edge position parameter of the object region and the lower edge position parameter of the first image comprises sub-steps of:

determining a reference position as an origin of coordinates in the first image;

selecting any point in a lower edge of the smallest rectangle as a first reference point, and determining a second reference point in a lower edge of the first image based on the first reference point; and calculating the distance to the to-be-detected object based on position coordinates of the first reference point and the second reference point.

10. The method according to claim 1, wherein the step of determining the position parameter of the ground based on the second image comprises sub-steps of:

acquiring point cloud data for structured light based on the intersection line of the line structured light beam with the to-be-detected object;

filtering the point cloud data for structured light based on the initial constraint condition of the ground;

fitting the filtered point cloud data for structured light to obtain a ground equation; and determining the position parameter of the ground by using the ground equation.

11. The method according to claim 1, wherein the step of determining the position parameter of the ground based on the second image comprises sub-steps of:

fitting the intersection line of the line structured light beam with the ground;

determining a ground equation based on at least two fitted intersection lines with the ground; and determining the position parameter of the ground by using the ground equation.

12. A robot, comprising a processor and a memory, wherein the memory stores computer program instructions executable by the processor, and the processor, when executing the computer program instructions, implements a distance measurement method, comprising steps of:

acquiring a first image, wherein the first image at least comprises a to-be-detected object and a ground on which the to-be-detected object is located;

determining an initial constraint condition of the ground based on the first image;

acquiring a second image, wherein the second image at least comprises an intersection line of a line structured light beam with at least one of the ground and the to-be-detected object;

determining a position parameter of the ground based on the second image, and correcting the initial constraint condition of the ground based on the position parameter; and determining a distance to the to-be-detected object based on the corrected initial constraint condition of the ground and the first image;

wherein, before the step of acquiring the second image, the method comprises a step of:

emitting at least one surface-scanning light beam that is not parallel to the ground by a line structured light source, the surface-scanning light beam forming at least one intersection line with the ground.

13. The robot according to claim 12, wherein the step of emitting at least one surface-scanning light beam that is not parallel to the ground by the line structured light source, the surface-scanning light beam forming at least one intersection line with the ground, comprises a sub-step of:

alternately emitting at least two surface-scanning light beams that are perpendicular to the ground by the line structured light source, the surface-scanning light beams forming at least two intersection lines with the ground; or emitting one transverse surface-scanning light beam that is not parallel to the ground and one surface-scanning light beam that is perpendicular to the ground by the line structured light source, the surface-scanning light beams forming at least two intersection lines with the ground.

14. The robot according to claim 12, wherein an image acquisition device for acquiring the first image is an infrared image acquisition device or a visible light image acquisition device; and an image acquisition device for acquiring the second image is an infrared image acquisition device.

15. The robot according to claim 12, wherein the step of determining the distance to the to-be-detected object based on the corrected initial constraint condition of the ground and the first image comprises sub-steps of:

determining an object region of the to-be-detected object in the first image, wherein the object region is the smallest rectangle comprising the to-be-detected object;

determining a lower edge position parameter of the object region and a lower edge position parameter of the first image based on the corrected initial constraint condition of the ground; and determining the distance to the to-be-detected object based on the lower edge position parameter of the object region and the lower edge position parameter of the first image.

16. The robot according to claim 12, wherein the step of determining the position parameter of the ground based on the second image comprises sub-steps of:

acquiring point cloud data for structured light based on the intersection line of the line structured light beam with the to-be-detected object;

filtering the point cloud data for structured light based on the initial constraint condition of the ground;

fitting the filtered point cloud data for structured light to obtain a ground equation; and determining the position parameter of the ground by using the ground equation.

17. The robot according to claim 12, wherein the step of determining the position parameter of the ground based on the second image comprises sub-steps of:

fitting the intersection line of the line structured light beam with the ground;

determining a ground equation based on at least two fitted intersection lines with the ground; and determining the position parameter of the ground by using the ground equation.

18. A non-transitory computer-readable storage medium having computer program instructions stored thereon, wherein the computer program instructions, when called and executed by a processor, implement a distance measurement method, comprising steps of:

acquiring a first image, wherein the first image at least comprises a to-be-detected object and a ground on which the to-be-detected object is located;

determining an initial constraint condition of the ground based on the first image;

acquiring a second image, wherein the second image at least comprises an intersection line of a line structured light beam with at least one of the ground and the to-be-detected object;

determining a position parameter of the ground based on the second image, and correcting the initial constraint condition of the ground based on the position parameter; and determining a distance to the to-be-detected object based on the corrected initial constraint condition of the ground and the first image;

wherein, before the step of acquiring the second image, the method comprises a step of:

emitting at least one surface-scanning light beam that is not parallel to the ground by a line structured light source, the surface-scanning light beam forming at least one intersection line with the ground.

* * * * *